Figure 1:
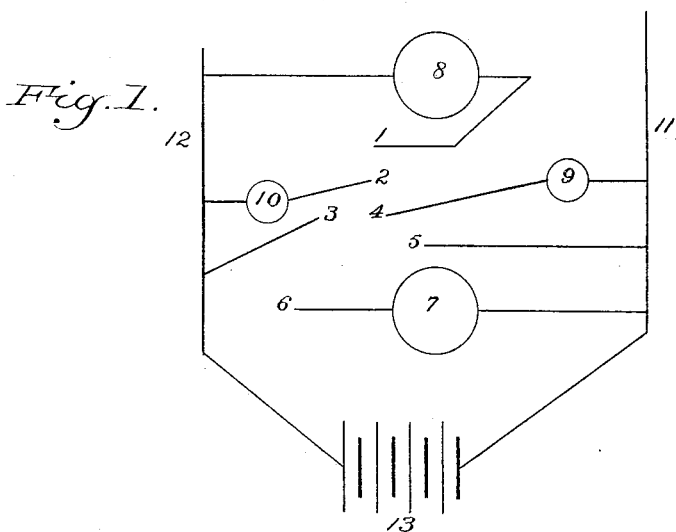

(No Model.)  2 Sheets—Sheet 1.

A. RECKENZAUN.
ELECTRIC CAR.

No. 320,092.  Patented June 16, 1885.

Witnesses:
T. Commerford Martin
Jos. Wetzler

Inventor:
A. Reckenzaun,
W. J. Johnston, Attorney
by Asso. Atty
Edward P. Thompson

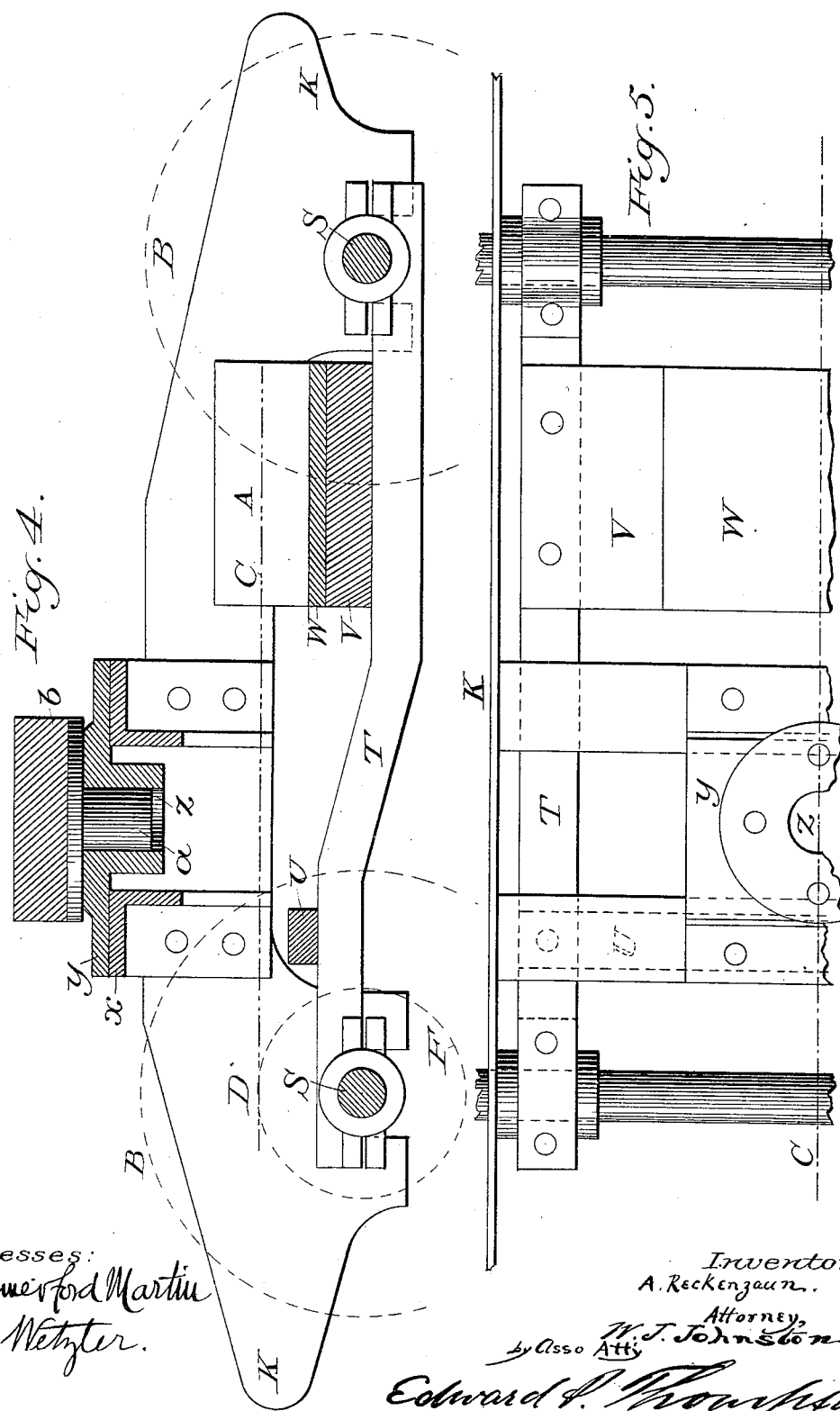

United States Patent Office.

ANTHONY RECKENZAUN, OF LONDON, ENGLAND, ASSIGNOR TO FREDERICK RECKENZAUN, OF NEW YORK, N. Y.

ELECTRIC CAR.

SPECIFICATION forming part of Letters Patent No. 320,092, dated June 16, 1885.

Application filed January 16, 1885. (No model.) Patented in England April 12, 1884, No. 6,275.

*To all whom it may concern:*

Be it known that I, ANTHONY RECKENZAUN, a citizen of Great Britain, and a resident of London, England, have invented certain new and useful Improvements in Electric Cars, of which the following is a specification.

The subject of the invention is more particularly the propulsion, regulation of the speed, and stopping of one or more cars or vehicles by means of electrical energy. The object, therefore, is to provide means whereby the current may be used in small or great currents in the most economical manner. A second object is to provide means whereby all the driving mechanism is connected with the truck and not permanently with the car. A third object is to provide means whereby the driving mechanism may be at a maximum distance from the ground. A fourth object is to provide means whereby the momentum of the car or cars may be employed to generate a current of electricity which may be used to assist, through the medium of magnetism, to stop the car. A fifth object is to provide means whereby an electric car may be caused to turn sharp curves.

The invention consists, essentially, in a car containing secondary or storage or primary batteries and mounted upon trucks provided with pivoted joints, said trucks supporting electric motors capable of being connected in series or in parallel with the battery, and capable of being connected in the circuit with the magnetic brake provided for the purpose, the shafts of said motors not being placed parallel to the axles of the truck, but at right angles thereto, so as to allow the employment of worm-gearing. A current sent through the motor or motors rotates the armature and drives the car along the rails, vice versa when the current is switched off from the motors the momentum of the car turns the worm-gearing and therefore rotates the armature of the motor. Another switch being turned on causes a current of electricity to be generated by the motors and the said current operates the brake and thereby assists in stopping the car.

In reference to the regulation of the speed in going around curves, up and down grade, and on a level, electro-motors are efficient only within certain limits—that is to say, a motor which has a high efficiency when giving off five-horse power on the driving-shaft, will probably give a smaller percentage of efficiency when working up to ten-horse power. On the other hand a motor constructed to work with the greatest economy at the rate of ten-horse power will not be so economical when giving out much less power. I propose to overcome this difficulty to a great extent by employing two, or, if desirable, more than two motors, which when working together will give the requisite power for starting the vehicle and mounting inclines, and when running on a level road the work of one such motor may be sufficient. These several motors may be alike in size, or they may be different; but the revolutions are made to correspond according to the gearing employed for transmission.

By means of switches or commutators I can arrange the circuit so that two or more motors may run in series in parallel or singly, or partly series and partly parallel, or an independent current from that in the armature continually pass through the field-magnets. The speed as well as the power can be varied in this manner, for as the resistance of the whole circuit changes so also changes the speed of the armature when the electromotive force of the supply-current is constant.

The electromotors are reversible, and the driving-gear is so arranged that the car can be driven from either end platform. If I employ two motors, I provide the shaft of each with a worm, which worm gears into a worm-wheel fixed upon the axle. I prefer to place the two motors in a line, so that the shaft of one drives a forward axle and the shaft of the other an aft axle, thus insuring a firmer grip upon the rails by multiplying the number of driving-wheels.

When I employ batteries, I place the cells upon trollies, rollers, or wheels underneath the seats, and provide openings in the car to permit of an easy removal and renewal of cells.

The brake arrangement consists of an electro-magnetic device working in conjunction with a hand-brake. A shaft having double cams when moved either way causes the iron brake-blocks to approach the wheels. The levers on the shaft are moved by a chain being wound upon the vertical spindle, to which is attached the brake-handle. The brake-power is thus greatly increased by magnetizing the iron brake-blocks. This brake can be made to work automatically—that is to say, the circuit may be closed by the movement of the brake-handle or by the movement of the main switch when in its "off" position, or by other suitable means. I do not confine myself to the exact shapes of details as indicated in the drawings, which will now be explained.

Figure 2:
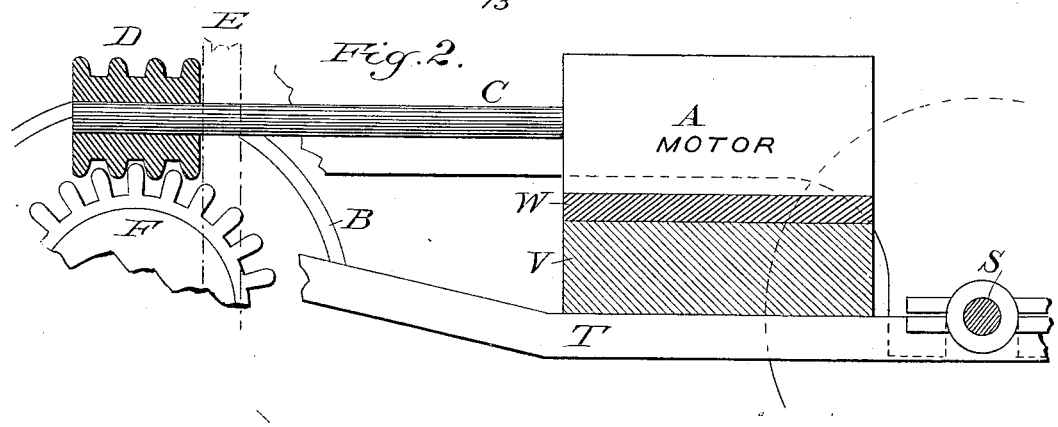

The system for regulating the current when two or more motors are used is shown in Figure 1. The driving mechanism is shown in Fig. 2; the combined electric and hand brake in Fig. 3; one truck, radial axles, foundation of motor all in side view in Fig. 4, and said truck, axles, &c., in bird's-eye view in Fig. 5.

Like letters in all the figures represent like parts. Dotted lines made up of alternate long and short dashes represent mere outlines. In Fig. 1 numbers of reference are used instead of letters, so that this figure is explained independently of the other figures.

The invention as described involves a car supported by two trucks, with a motor on each truck. In order that the drawings may be on as large a scale as possible, and as both trucks and everything connected therewith are alike in every respect, only one of said trucks, together with the parts connected thereto, is shown.

Fig. 1 is a diagram, in which 13 represents the storage-battery; 11 and 12, the main conducting-wires; 7 and 8, the motors; 9 and 10, the electric brakes, and 1, 2, 3, 4, 5, and 6, the terminals, which, when connected any one with any other by means of separate or compound switches, will put the motors in parallel or in series with the battery, the electric brakes in series with the motor as a dynamo, &c. Connect 1 and 6, then the motors will be in series with the battery. Connect 1 and 5 and also 3 and 6, then will the motors be in parallel with the battery. Connect 3 and 6 or 1 and 5, then will only one motor be in circuit with the battery. Connect 1 and 2 and 4 and 6, then will the electro-magnetic brakes be separately in circuit with the motors or dynamos. Connect 2 and 4, then will the brakes be in circuit in series with the battery.

The terminals may be led in any convenient manner to the end of the car or to such a point desired by the engineer; also two or more sets may be installed, so that the car may be operated from more than one point. The storage-battery may be a primary battery, which is an equivalent.

All the parts of the system may be arranged and rearranged in a multitude of ways; but this part of my invention relates to the general system of distribution of the current from the battery and from the motors when used as a dynamo.

In Figs. 2, 3, 4, and 5 letters of reference are used, so as not to make any confusion with Fig. 1. They represent in important details the manner in which my invention is made practical. Fig. 2 gives a general idea as to how the motion is communicated from the motor A to the wheels B. (Shown in portion.) The shaft C with the worm D rotates the worm-wheel F, fixed upon the axle of the car-wheels B. The motor is supported as shown in another figure, and its shaft is supported at one end by an upright or equivalent, E, which is a projection from the car-truck.

The motor in electric cars has heretofore been placed as low as the axles of the car-wheels, thus exposing them all the more to dust and accidental injury by being so close to the ground. The use of the worm-wheel gearing in such cars in the manner shown obviates this inconvenience, and becomes of great advantage over other methods of communicating the motion of the motor to the car.

There are generally two trucks of four wheels each. In such cases I would have a motor on each truck, operating a pair of wheels on each truck. I would connect them with worm-gearing, substantially as described.

Figure 3:
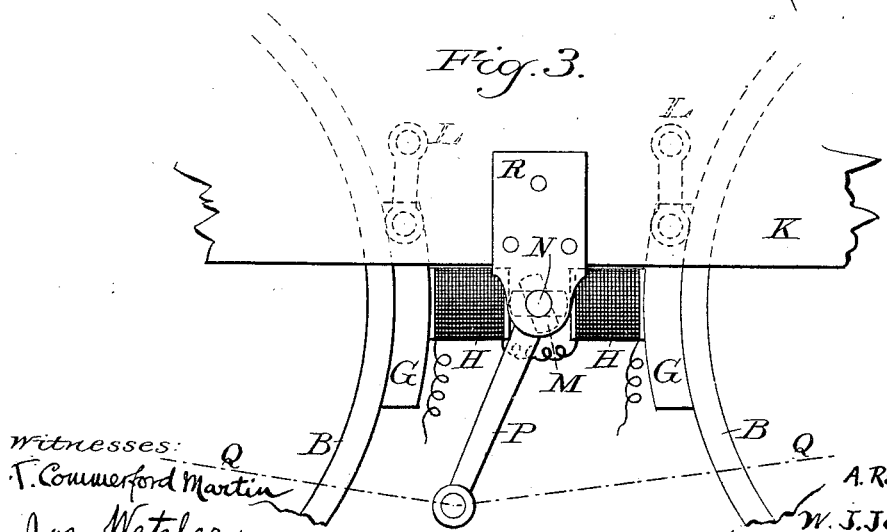

Fig. 3 represents the general construction of the electric brake and connections. Brake-blocks G, with projections wound with wire, form electro-magnets H, and are hung near the rims of the wheels B by lever links or supports L, suspended by loose rivets from the sides K of the truck. Between the brake-blocks is any suitable double cam, such as M, consisting of a piece as represented, or of any other form so long as it will, when turned together with its axle N by means of the lever P and chain or rope Q, leading to both platforms or other part of the car, press the two brake-blocks against the wheels. At the same time, or a little before the chain Q is pulled, the motor or dynamo is put in circuit with the electric brakes, so that the magnets H will repel each other—that is, so that their magnetism will pull them with considerable force against the wheels, and thereby assist to or entirely stop the car. The shaft N is supported by bearings R, suspended from the sides K of the truck, or from any of the framework of the truck.

I do not limit myself to the particular construction of the magnets and brakes here shown, nor do I represent all the modifications of details which might be made. The drawings are to be understood as representing, in a general way, the realization of the idea of operating an electric brake by the very force of momentum of the car.

In Figs. 4 and 5 is shown what might most comprehensively be called the "foundation" or frame or truck, which supports not only the car, but also the motor, brakes, gearing, &c. The bird's-eye view, Fig. 5, represents only half the truck, the other half being in all respects the same, while Fig. 4 is a sectional side view. The two axles S of the car-wheels are connected by beams T, connected by two or more cross-pieces, U and V, which support the motor, the base of the motor being shown by W. The pieces connecting the axles of the car-wheels allow the free rotation of the said axles. The side pieces, K, may be connected also to the beams T by bolts. The side pieces in turn support the bridges X, which support the square piece Y containing the hole Z. Into this hole fits a journal, A, fastened rigidly and permanently to a beam, b, of the car-frame. The other end of the car is supported by a similar truck and pivot.

Springs may be provided in the usual manner at the axles, and all other details may be varied indefinitely; but this part of my invention consists in constructing an electric car in which the principal mechanisms are entirely independent of the car proper.

Having described my electric car in such a way that any one versed in the art may construct it, I now wish to claim as my invention the following:

1. In combination with an electric car, two trucks provided with pivot-joints, which support the car, and two motors adapted to propel said car, one of said motors being located upon one truck, and the other of said motors being located upon the other truck.

2. In combination, substantially as described, with car-trucks provided with pivot-joints, which trucks support both the car and electric motors, of secondary or primary batteries in series with the motors.

3. The combination of the car-trucks provided with pivot-joints, which support a car, and electric motors adapted to drive or propel the car and attached to said trucks.

4. In an electric car, in combination with each of the two trucks of a car, a motor whose shaft is provided with the worm-pinion D, which is adapted to gear into the wheel F upon the car-axle, the shaft of the motor being at right angles to the car-axle.

5. The combination, substantially as hereinbefore set forth, of electric car-trucks provided with pivot-joints, which support the car, one or more electric motors in circuit with an electric storage or primary battery contained within the car, and worm-gearing connecting said motors with the axles of the car-wheels.

6. In combination with two parallel beams attached at their ends by journal-bearings to the two car-axles of a car-truck, an electric motor attached to a third beam, which is at right angles to the said parallel beams and which is secured to the said parallel beams.

7. An electric motor, in combination with a car-wheel axle and with a truck, which is attached rigidly to the motor and by pivot-joints to the car.

A. RECKENZAUN.

Witnesses:
   EDWIN C. WALKER,
   FREDERIC WILLOUGHBY,
*Clerks to Messrs. Comerford & Co., Public Notaries, London.*